United States Patent
Park

[11] Patent Number: 5,981,269
[45] Date of Patent: Nov. 9, 1999

[54] APPARATUS FOR FERMENTING AND COMPOSTING FOOD WASTE

[76] Inventor: Joon Park, 4-901 Chunghwa Apt., Itaewon-dong, Youngsan-ku, Seoul, Rep. of Korea

[21] Appl. No.: 08/914,894

[22] Filed: Aug. 20, 1997

[51] Int. Cl.$^6$ ..................................................... C12M 3/00
[52] U.S. Cl. ................................. 435/290.2; 366/325.1; 366/328.1
[58] Field of Search ........................... 99/348; 366/325.1, 366/328.1; 435/290.1, 290.2

[56] References Cited

U.S. PATENT DOCUMENTS

| | | | |
|---|---|---|---|
| 4,302,546 | 11/1981 | Schlichting | 435/290.2 |
| 5,587,320 | 12/1996 | Shindo et al. | 435/290.1 |

FOREIGN PATENT DOCUMENTS

| | | | |
|---|---|---|---|
| 0 599 661 A1 | 6/1994 | European Pat. Off. | 435/290.2 |
| 406157178A | 6/1994 | Japan | 435/290.2 |
| 7902-752 | 10/1980 | Netherlands | 435/290.2 |

Primary Examiner—David A. Redding

[57] ABSTRACT

The present invention relates to an apparatus for fermenting and composting food waste which can compost food waste having much more weight by decomposing and practically reducing the waste at the source, such as homes, restaurants, etc., directly, or ferment them by fermenting or drying them, if needed. A fermenting barrel of U-shaped cross-section with a filling opening and a discharging opening is formed on a frame at the inner side of the apparatus. A rotating stirring shaft is formed in the fermenting barrel so that the rotating stirring shaft passes through the center of the fermenting barrel. A decelerator is connected at one end of the rotating stirring shaft by gears, and a blower is connected at the other end of the rotating stirring shaft through a connecting pipe. A ventilating pipe with a plurality of ventilating holes on the rotating stirring shaft is connected with the rotating stirring shaft in parallel. Supporting shafts are radially arranged apart from each other, and rotating stirring wings in the shape of triangular cones having an arc-shaped bottom portion are formed at the ends of the supporting shafts. An electric heating coil is wound on the outer surface of the fermenting barrel and is covered by a heat shielding layer. A suction pipe is mounted so that it passes through the upper portion of the fermenting barrel.

1 Claim, 4 Drawing Sheets

APPARATUS FOR FERMENTING AND COMPOSTING FOOD WASTE

BACKGROUND OF THE INVENTION

1. Field of the Invention

The present invention relates to a device for composting food waste having an increasing amount of weight by reducing the volume of the waste where it is created, e.g. at homes, restaurants, etc., by fermentation or drying, if need.

2. Description of Related Art

The accumulation of food waste in homes, restaurants, schools, etc., has created a new cause of environmental contamination. Therefore, the treatment of food waste has become an important social issue, and since the cost of treating food waste has substantially increased, the problem has become one of national concern.

With respect to the afore-mentioned problem, various devices for treating food waste have been developed which compost the waste by drying, fermentation and decomposition. However, since conventional devices are not sufficiently and uniformly provided with heat and oxygen, the time required for fermentation is increased. Further, since the structure of the device for stirring food waste is not adaptively designed, the stirring efficiency of the stirring device is decreased, leaving partially unstirred large portions of food waste. Therefore, the uniform fermentation of food waste in conventional devices when treating food waste is impossible.

SUMMARY OF THE INVENTION

In order to solve the above problems, the present invention provides an apparatus for fermenting and composting food waste which can uniformly decompose and dehydrate food waste by using a very efficient stirring device for immediately fermenting and composting them without disposing of them, and produce feeds and composts composed of the food waste.

According to one aspect of the invention, the apparatus includes a fermenting barrel having U-shaped cross-section with a filling opening and a discharging opening formed on a frame at the inner side of the apparatus. A rotating stirring shaft is formed in the fermenting barrel so that the rotating stirring shaft passes through the center of the fermenting barrel. A decelerator is connected at one end of the rotating stirring shaft by means of gears, and a blower is connected at the other end of the rotating stirring shaft through a connecting pipe. A ventilating pipe with a plurality of ventilating holes on the rotating stirring shaft is connected with the rotating stirring shaft in parallel. Supporting shafts are eccentrically arranged apart from each other, and rotating stirring wings in the shape of triangular cones having an arc-shaped bottom portion are formed at the ends of supporting shafts. An electric heating coil is wound on the outer surface of the fermenting barrel and covered by a heat shielding layer. A suction pipe is mounted so that it passes through the upper portion of the fermenting barrel.

BRIEF DESCRIPTION OF THE DRAWINGS

For a complete understanding of the present invention, a preferred embodiment according to the present invention will now be described in detail with reference to the accompanying drawings in which.

DETAILED DESCRIPTION OF THE INVENTION

Figure 1:
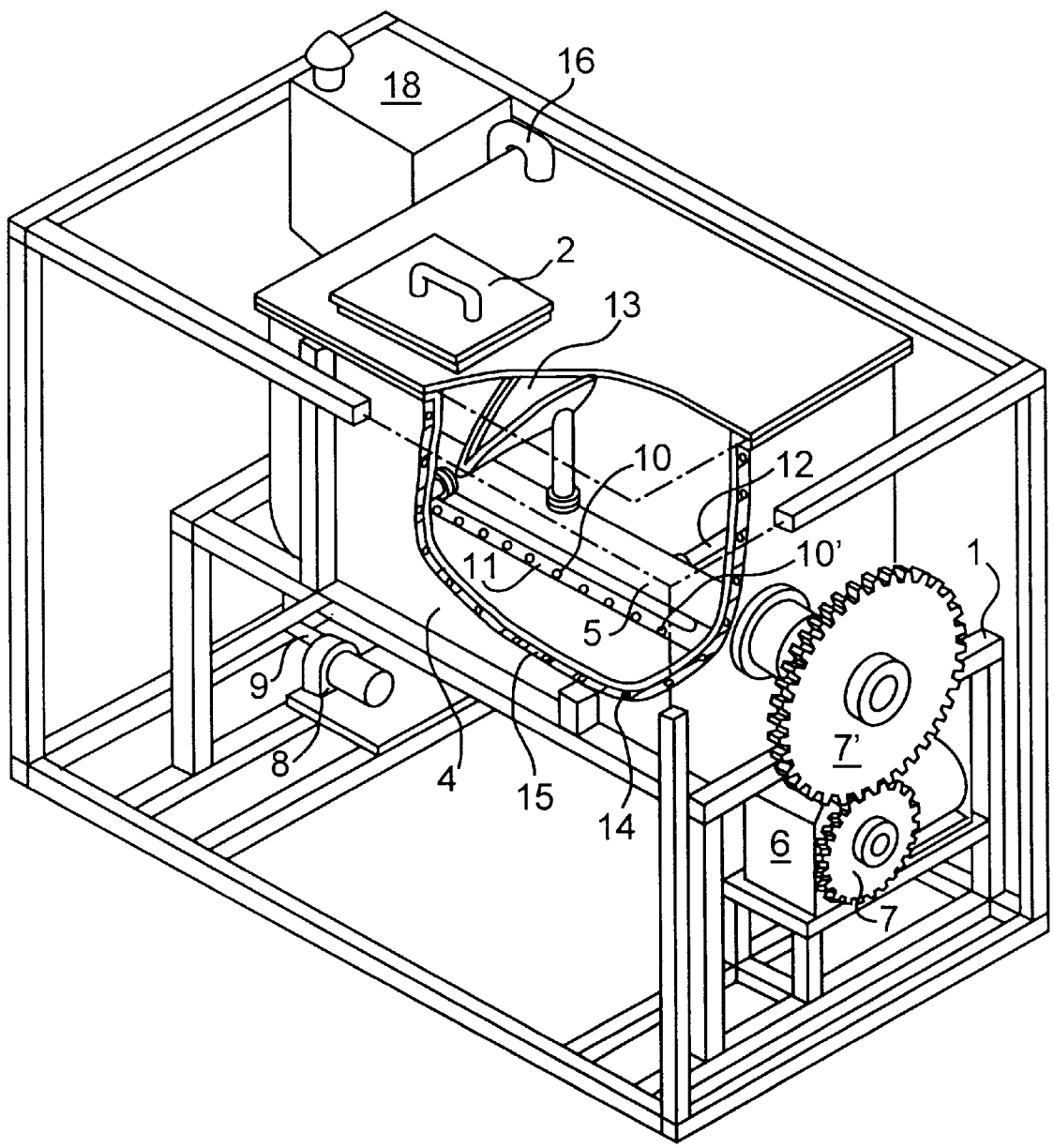
FIG. 1 is an internal perspective view of an apparatus according to the invention, which is partially sectionalized.
Figure 2:
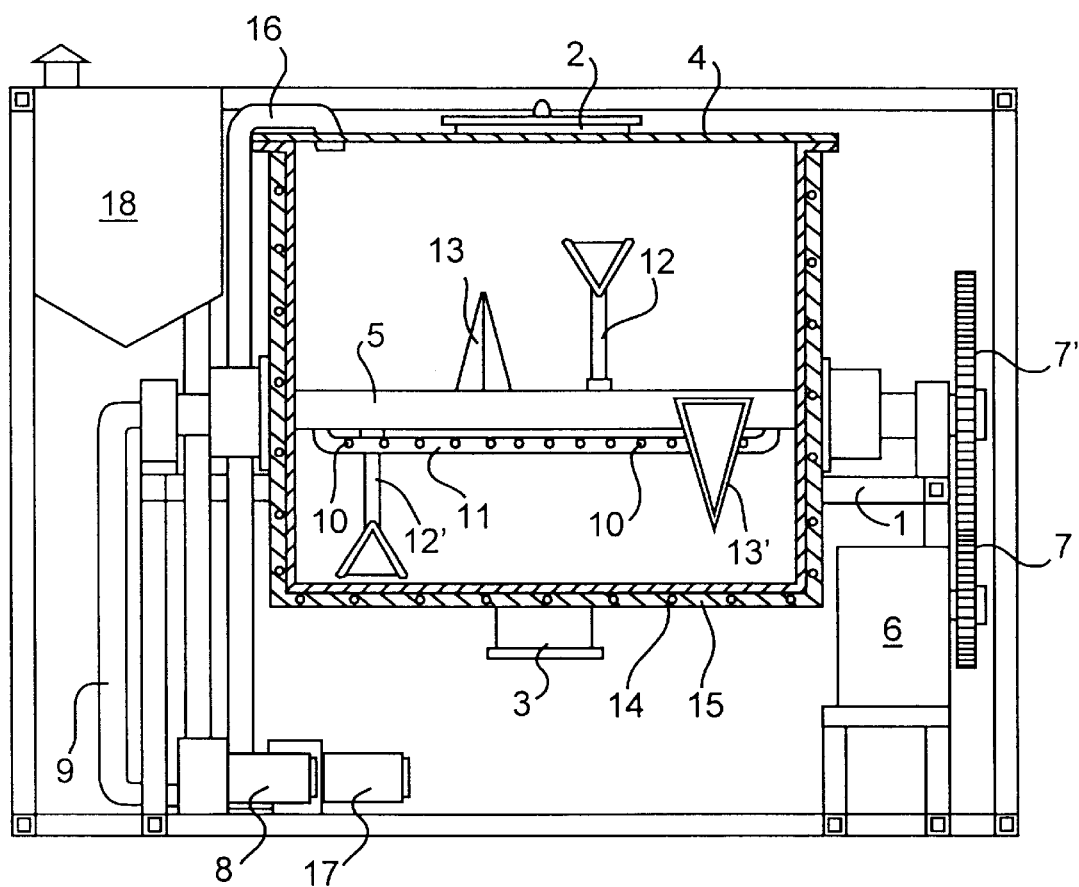
FIG. 2 is a cross-sectional view of the apparatus according to the invention.
Figure 3:
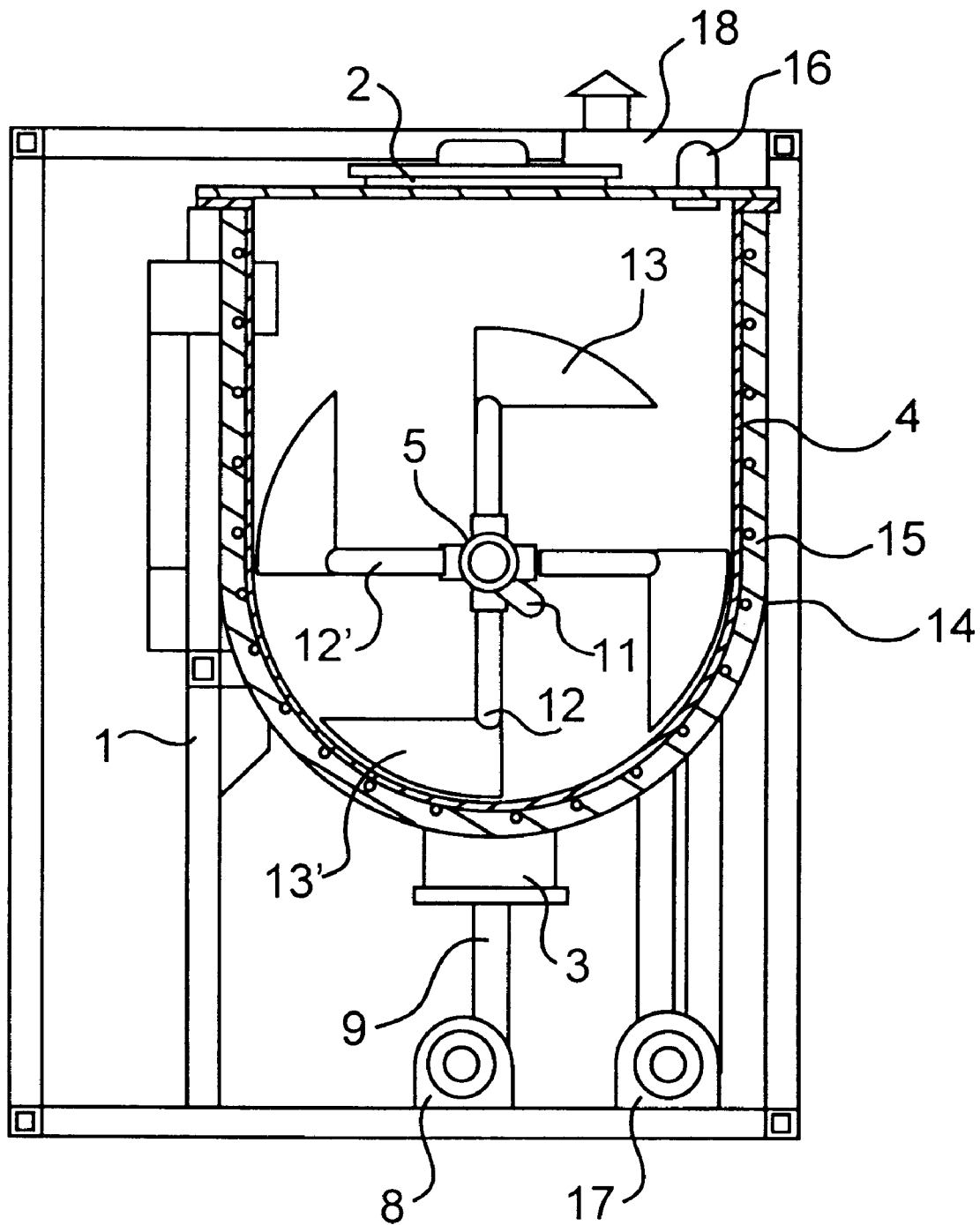
FIG. 3 is a longitudinally sectional view of the apparatus according to the invention.

Referring to FIG. 1 and FIG. 2, the apparatus for fermenting and composting food waste according to the present invention comprises a fermenting barrel 4 of U-shaped cross-section with a filling opening 2 and a discharging opening 3 on a frame 1 at the inner side of the apparatus.

Figure 4:
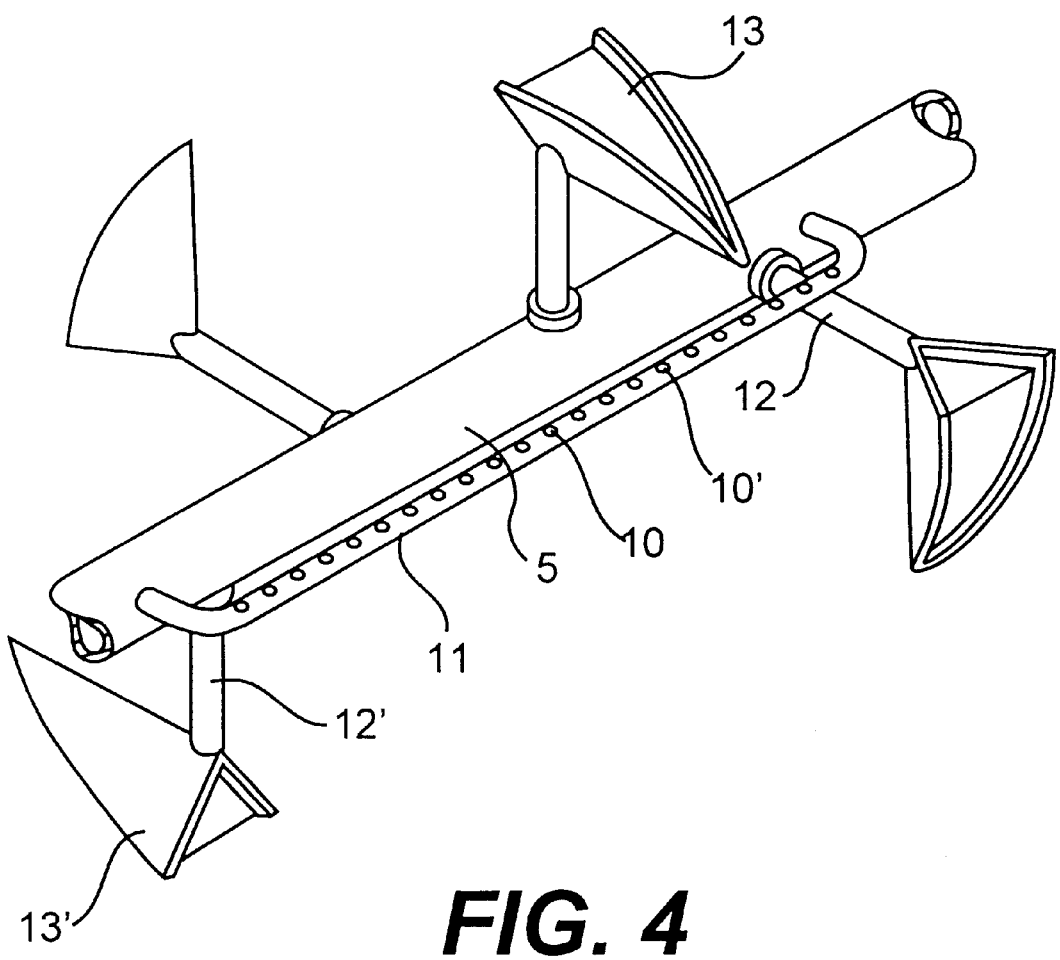
FIG. 4 is a perspective view of a rotating stirring shaft according to the invention.

A rotating stirring shaft 5 having a pipe-shape is formed in the fermenting barrel 4 so that it passes through the center of the fermenting barrel 4. A decelerator 6 is connected at one end of the rotating stirring shaft 5 by means of two gears 7 and 7', and a blower 8 is connected at the other end of the rotating stirring shaft 5 through a connecting pipe 9. A ventilating pipe 11 with a plurality of ventilating holes 10 and 10' therein is connected in parallel with the rotating stirring shaft 5. Four supporting shafts 12 and 12' are radially arranged apart from each other and, as shown in FIG. 4, four rotating stirring wings 13 and 13' in the shape of triangular cones having an arc-shaped bottom portion are formed at the ends of the four supporting shafts 12 and 12'.

An electric heating coil 14 is wound on the outer surface of the fermenting barrel 4 and covered by a heat shielding layer 15, and a suction pipe 16 is mounted so that it passes through the upper portion of the fermenting barrel 4.

Two reference numerals 17 and 18 not explained are a suction pump and a deodorizing tower, respectively.

The operation and effect of the apparatus of the invention constituted as described above will now be explained with reference to the Figures.

First, when the apparatus is started, the rotating stirring shaft 5 in the fermenting barrel 4 is rotated by means of the decelerator 6 and the two gears 7 and 7'. After the filling opening 2 is opened, various food waste is placed into the fermenting barrel 4 through the filling opening 2.

Then, the food waste in the fermenting barrel 4 is maintained at the internal temperature of 40° C. to 60° C. by the electric heating coiled 14 wound on the surface of the fermenting barrel 4 and stirred by the supporting shafts 12 and 12' and the stirring wings 13 and 13' having the shape of triangular cones. At this time, air flows into the fermenting barrel 4 through the ventilating pipe 11 with the plurality of ventilating holes 10 and 10' by the blower 8, so that the food waste may be fermented and decomposed into feed.

Then, the food waste being fermented in the fermenting barrel 4 is continuously stirred by the supporting shafts 12 and 12' formed at the rotating stirring shaft 5 and the stirring wings 13 and 13' having the shape of triangular cones. Since the stirring wings 13 and 13' are in the shape of triangular cones with the arc-shaped bottom portion and have a protruding portion at the front side toward the rotating direction, they are not subject to overload due to the food waste during rotational stirring, so that all the rotating force of the motor can be transferred to the rotating stirring wings 13 and 13' through the rotating stirring shaft 5 without idle rotation of the motor. Thus, the efficiency of the rotational stirring of the food waste is increased and it is possible to stir the food waste at the corners of the fermenting barrel 4. Therefore, according to the invention, it is possible to uniformly ferment all the food waste with excellent efficiency and produce high quality compost.

When the food waste is uniformly stirred and fermented as above, exothermic reaction occurs in the fermenting barrel 4, and thus the temperature in the fermenting barrel 4 is raised, so that the water in the food waste is evaporated and all the organic materials in the food waste can be decomposed. At this time, the water being evaporated and the gases being discharged, which are formed by decomposition of the organic material, are suctioned out through the deodorizing tower 18 by the suction pump 17, so that is possible to prevent an offensive odor and secondary pollution. Further, during the suctioning step, air is newly provided into the fermenting barrel 4 through the ventilating pipe 11 with the plurality of ventilating holes 10 by the blower 8, and thus it is possible to continuously decompose food waste.

On the other hand, the fermenting method is the same as that of the above-explained composting method except that, in the case of fermenting food waste, the fermenting barrel 4 is maintained at the high temperature by the electric heating coil 14 wound on the surface of the fermenting barrel 4 so that the water vapors produced with the drying of the food waste can be easily removed.

The food waste being dried is continuously stirred by the supporting shafts 12 and 12' formed at the rotating stirring shaft 5 and the stirring wings 13 and 13' having the shape of triangular cones as in the case of the fermenting of food waste. Thus, the stirring efficiency of the food waste being dried in the fermenting barrel 4 is excellent, so that the food waste can be uniformly dried and it is possible to produce high quality feed.

With the above explained operation of the apparatus according to the invention, food waste treated daily by a certain quantity are dried and then shrunk by 95% in the case of the composting or by 80% in the case of fermenting so that it is possible to ferment about 20% of the food waste.

That is, with this operation of the apparatus, in contrast with composting, the fermentation of food waste can produce more feed.

It should be noted that the dried quantity of food waste daily treated should be monitored once every 15 days and then the treated food waste in the fermenting barrel 4 should be discharged. But, it is possible to discharge the treated food waste daily if needed.

That is, since the discharging period of the treated food waste can be adjusted according to the quantity of the treated food waste without discharging them, it is possible to treat a large quantity of food waste by the use of the apparatus of small capacity according to the invention.

Therefore, according to the present invention, the apparatus can treat food waste by uniformly fermenting and practically reducing them directly at the waste discharging places, such as homes, restaurants, etc., and produce high quality feed, so that the production of unusable waste can be efficiently prevented. Further, it can be used to ferment food waste if large amounts of food waste are produced, or if a user wants to ferment the food waste at farm lands, pasture lands, etc.

What is claimed is:

1. An apparatus for composting food waste comprising:

a fermenting barrel having a U-shaped cross-section, said fermenting barrel having a filling opening and a discharging opening formed therein;

a frame for supporting said fermenting barrel;

a rotating stirring shaft having a hollow tubular configuration located in the fermenting barrel so that the rotating stirring shaft passes through the center of the fermenting barrel;

a decelerator connected to one end of the rotating stirring shaft, said decelerator including a pair of gears;

a blower connected to the other end of the rotating stirring shaft through a connecting pipe;

a ventilating pipe having a plurality of ventilating holes therein connected in parallel with the rotating stirring shaft;

a plurality of supporting shafts radially extending from said rotating stirring shaft and spaced-apart from each other, each of said stirring shafts including a rotating stirring wing located at a distal end thereof formed in the shape of a triangular cone having an arc-shaped bottom portion;

an electric heating coil wound on an outer surface of the fermenting barrel and covered by a heat shielding layer; and a suction pipe mounted so that it passes through the upper portion of the fermenting barrel.

* * * * *